INVENTOR
Bror W. Henrikson

BY Dawson, Tilton, Fallon,
Lungmus, and Alexander
ATTORNEYS

United States Patent Office 3,377,102
Patented Apr. 9, 1968

3,377,102
VEHICLE SEAT BELT ANCHORAGE
Bror W. Henrikson, Grand Rapids, Mich., assignor to American Seating Company, Grand Rapids, Mich., a corporation of Delaware
Filed Feb. 9, 1967, Ser. No. 614,987
6 Claims. (Cl. 297—385)

ABSTRACT OF THE DISCLOSURE

A vehicle seat belt anchorage, especially useful for a driver's seat, in which a plate is anchored to the floor below the seat and has a rigid belt support extending upwardly to an elevation at a rear corner of the seat with an attachment for the seat belt. Diagonal braces from the forward portion of the plate extend to the top portion of the support.

*Brief summary of the invention*

Seat belts have heretofore been secured to the seat itself or, more frequently, to the floor at the rear of the seat. In the latter case, the seat belts form an obstruction in the foot area of passages to the rear of the seat and the belts are stepped on and moved by passengers causing discomfort to the driver or front seat occupant. Further, the belts are long and there is a tendency for greater stretch, while at the same time the load is concentrated on a relatively small floor area.

When the seat belts are attached to the seat, a severe load is placed upon the seat, and in the case of a driver's seat having adjustable features, the cost is prohibitive for each or any of such structural features has to be capable of sustaining a pull in the neighborhood of about 6,000 pounds.

The present invention provides an elevated rigid support adjacent a rear corner of the seat which carries the load independently of the seat and thus enables seats to be employed with the various adjustment features desired. Further, by reinforcing the floor with an anchor plate secured to the floor below the seat and extending the rigid support rearwardly and upwardly to a position near a rear corner of the seat, a concealed support is provided which does not obstruct foot space, and by the use of diagonal tubes or rods extending from the front of the plate to the upper portion of the rigid belt support, a sturdy and effective elevated support is provided, enabling relatively short seat belts to be employed and utilized at the desired 45° angle. The plate may also support a seat base and the weight of the seat thus utilized in the anchoring of the plate against the floor.

While the invention is especially useful in connection with a bus driver's seat, the invention is also useful for the ordinary passenger seats of a bus or ordinary automobile having one or more seats.

*Detailed description*

Figure 1:
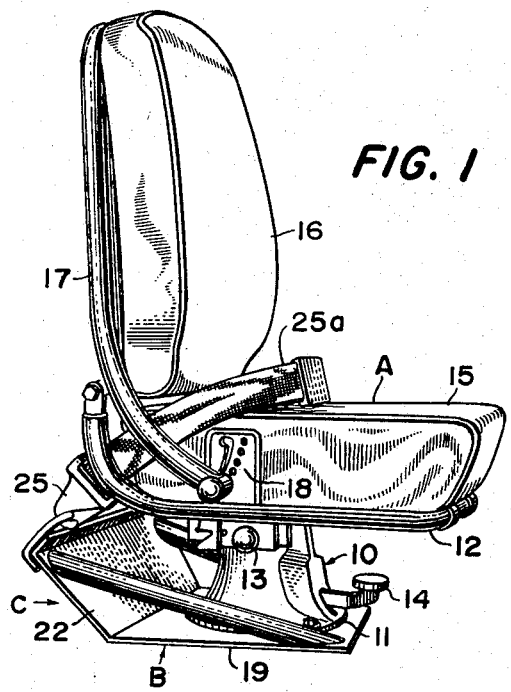
FIG. 1 is a perspective view of a driver's seat and the seat belt anchorage embodying my invention.

In the illustration given, A designates a driver's seat and B designates a seat belt anchor.

The seat A may be of any suitable construction. It may be an ordinary automobile seat of a passenger car, one of several seats employed in a bus for passengers, or a driver's seat, as shown in the drawing. In the illustrative seat shown in the drawing, 10 designates a seat base having at its bottom an outwardly-flared flange 11, and supporting at its top a frame 12 slidably supported and locked by pin 13 carried by the frame 12. A foot lever 14 may be utilized for raising and lowering the frame 12, etc. A seat 15 is mounted upon the frame 12, and a seat back 16 is supported upon a frame 17 tiltably mounted on the frame standard 18. Since the mechanism for tilting the seat back or the seat frame or for elevating and lowering the frame 12 is well known in the art, a further detailed description herein is believed unnecessary.

Figure 5:
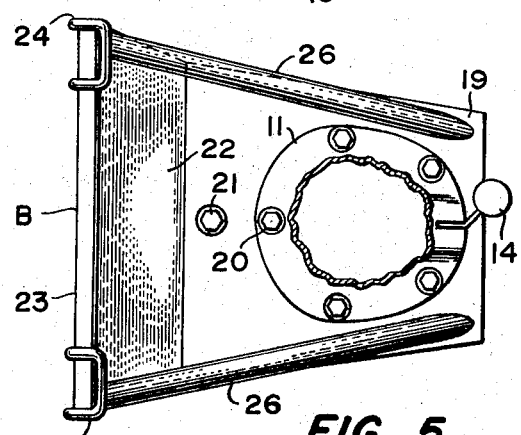
FIG. 5, a top plan view of the structure shown in FIG. 4 but showing a portion of the seat base attached to the anchor plate.

The seat belt anchorage B, in the illustration given, comprises a plate 19 extending below the seat 15 and provided with bolt or other attachment openings for securing the plate to the floor of the vehicle. In the illustration given in FIG. 5, the bolts 20 extend through the flange 11 of the seat base 10 and then through the plate 19 for securing the base and plate to the floor of the vehicle. I prefer to have one or more independent bolts 21 extending through the plate 19 only for independently anchoring the plate to the floor.

The plate 19 is provided at its rear with a rigid belt support 22 which extends rearwardly and upwardly and is provided at its top with a forwardly-extending flange 23. Secured to the support 22 at each end thereof are metal lops or anchors 24 for receiving the ends or fittings 25 of the seat belts 25a. While I have shown the support 22 integral with plate 19, it will be understood that other forms of supports may be welded or secured to the plate 19 and extended upwardly to carry the anchors 24.

In the specific illustration given, the plate 19 is tapered in contour, being relatively narrow at its forward end and widening as it approaches the rear elevated support flange 23, thus providing, for example, end anchors 24 which may be a desirable 16″ apart, thus eliminating any pinching tendency which would occur when the belt anchors are close together. Thus the wide support 22 not only maintains the anchors 24 at an elevated position so that the safety belts may extend therefrom at about a 45° angle, but also maintaining the ends of the seat belts firmly in widely spaced-apart relation and at an elevated position adjacent the seat. It will be understood that, if desired, only one end of the seat belt may be attached to one of the anchors so provided, and the other end of the seat belt may be attached to another part of the automobile frame. I prefer, however, in the case of a driver's seat, to support both ends of the safety belt by a rigid member at the desired elevation and in the widely spaced position shown.

In order to withstand the extremely heavy load imposed upon the belt anchors while at the same time employing a relatively light support structure, I provide diagonal braces 26 which extend from a forward part of the plate 19 rearwardly and upwardly to the upper portion of the rigid support 22. Preferably, the braces 26 are formed of tubes having beveled ends, but it will be understood that other brace means may be employed.

In the operation of the structure, the driver's seat may be operated for tilting, raising and lowering, etc. in the usual manner, and the seat belts are adjusted by the driver independently of such operations by simply attaching the end fittings 25 of the seat belts to the anchor loops 24. In the case of a sudden halting of the vehicle, the extreme pull caused by the weight of the driver moving forwardly is sustained by the short seat belts 25a, the thrust of the load being transmitted through the brace tubes 26 to the anchor plate 19. Thus the load is carried independently of the seat structure A.

Figure 2:
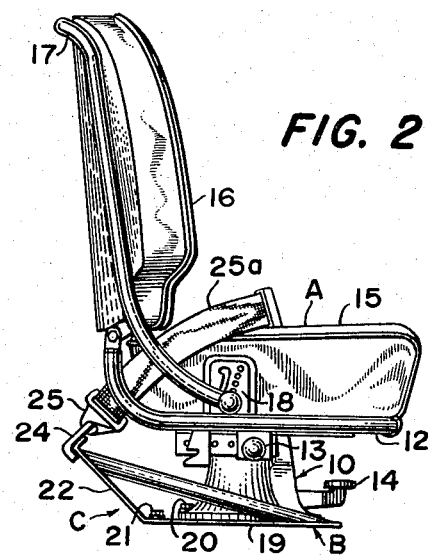
FIG. 2, a side view in elevation.
Figure 4:
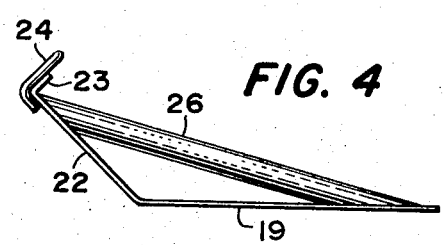
FIG. 4, a side view in elevation of the floor plate and rigid belt support.
Figure 3:
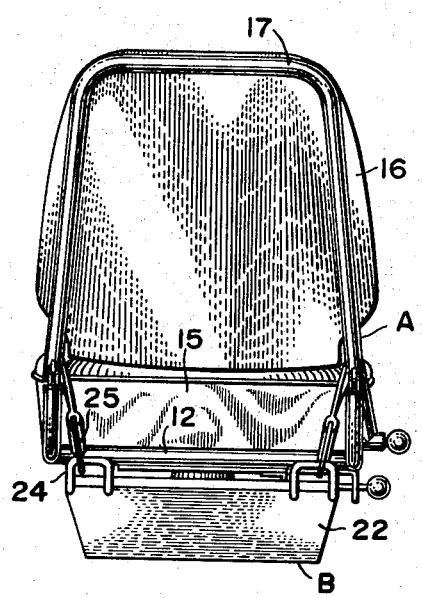
FIG. 3, a rear view in elevation.

As shown best in FIGS. 1 and 2, the belt anchorage is provided in an area below the seat itself and without forming an obstruction outside of the confines of the seat. The rigid support is substantially subtended by the seat body, which includes the seat 15 and the back members 16 and 17 thereabove. In the case where there are successive seats arranged in tandem, the upwardly-inclined rigid support 22 provides a foot space, indicated by the letter C, in the area behind the seat, as shown best in FIGS. 1 and 2.

While in the foregoing specification I have shown a specific structure in considerable detail for the purpose of illustrating the invention, it will be understood that such details may be varied widely by those skilled in the art without departing from the spirit of my invention.

I claim:

1. In a vehicle having a seat and seat belts to be secured about the occupant of said seat, the improvement which comprises a rigid support adapted to be anchored to the vehicle floor below said seat and extending upwardly to an elevation near and to the rear of a rear corner of said seat, a belt anchor carried by the upper portion of said rigid support, and a diagonal brace extending from a front portion of said plate upwardly and rearwardly to the upper portion of said rigid support.

2. In a vehicle equipped with a seat and a safety belt therefor, a base plate adapted to be secured to the floor of said vehicle and having an upwardly-turned support providing an elevated rigid base adjacent a rear corner of said seat, means for anchoring said belt to an elevated portion of said support, and a diagonal brace extending from a forward portion of said plate to an upper portion of said elevated support member.

3. The structure of claim 2 in which said support is integral with said plate.

4. The structure of claim 2 in which said diagonal brace is tubular having a beveled end secured to the forward end of said plate and a rear beveled end secured to the top of said support.

5. In a vehicle having a driver's seat mounted on the floor thereof and having also seat belts to be secured about the driver, a plate adapted to be anchored to the floor of the vehicle, means for securing said plate to the floor under said seat base, a member carried by the rear portion of said plate and extending upwardly and rearwardly to provide an elevated rigid support near a rear corner of said seat, a belt anchor carried by an upper portion of said support and brace tubes extending on each side of the base from the front of said plate to the upper portion of said rigid support.

6. A safety belt support, comprising a plate adapted to receive a seat base thereon and having openings for receiving attachment means to a vehicle floor, said plate being provided at its rear with an upwardly and rearwardly inclined element, a belt anchor carried by the upper portion of said element, and a diagonal brace fixed to the front of said plate and inclined upwardly and fixed to the upper portion of said element.

References Cited

UNITED STATES PATENTS

| | | | |
|---|---|---|---|
| 3,186,760 | 6/1965 | Lohr et al. | 297—385 X |
| 3,288,422 | 11/1966 | Krause | 297—385 X |
| 3,328,080 | 6/1967 | Dall | 297—385 |

JAMES T. McCALL, *Primary Examiner.*